United States Patent
Scortichini et al.

(12)

(10) Patent No.: US 6,312,845 B1
(45) Date of Patent: *Nov. 6, 2001

(54) MACROPOROUS FLOW FIELD ASSEMBLY

(75) Inventors: Carey L. Scortichini; Robert D. Mussell; Susan J. Babinec, all of Midland, MI (US)

(73) Assignee: The Dow Chemical Company, Midland, MI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/862,273

(22) Filed: May 23, 1997

Related U.S. Application Data

(63) Continuation-in-part of application No. 08/540,105, filed on Oct. 6, 1995, now abandoned.

(51) Int. Cl.[7] .............................. H01M 4/96; H01M 8/04
(52) U.S. Cl. .............................. 429/30; 429/32; 429/34; 429/42
(58) Field of Search .................................. 429/30, 32, 34, 429/35, 38, 39, 42

(56) References Cited

U.S. PATENT DOCUMENTS

| | | | |
|---|---|---|---|
| 3,733,221 | 5/1973 | Sandler et al. | 136/120 |
| 4,125,676 | * 11/1978 | Maricle et al. | 429/38 |
| 4,215,183 | 7/1980 | MacLeod | 429/30 |
| 4,287,232 | 9/1981 | Goller et al. | 427/113 |
| 4,469,579 | 9/1984 | Covitch et al. | 204/283 |
| 4,505,992 | 3/1985 | Dettling et al. | 429/36 |
| 4,580,337 | * 4/1986 | Shigeta et al. | 429/34 X |
| 4,602,426 | 7/1986 | Kampe et al. | 29/623.1 |
| 4,847,173 | 7/1989 | Mitsunaga et al. | 429/41 |
| 4,927,514 | 5/1990 | Solomon et al. | 204/290 R |

(List continued on next page.)

FOREIGN PATENT DOCUMENTS

| | | |
|---|---|---|
| 0 064 389 | 11/1982 | (EP) . |
| 0 276 987 | 8/1988 | (EP) . |
| 0 305 565 | 3/1989 | (EP) . |
| 0 357 077 | 3/1990 | (EP) . |
| 0 364 297 | 4/1990 | (EP) . |
| 0 560 295 | 9/1993 | (EP) . |
| 0 577 291 | 1/1994 | (EP) . |
| 0 629 015 | 12/1994 | (EP) . |
| 0 687 023 | 12/1995 | (EP) . |
| 0 718 903 | 6/1996 | (EP) . |

(List continued on next page.)

OTHER PUBLICATIONS

Chemical Abstract No. 14273q, vol. 105 (1986). (Jul.).

Exploratory Fuel Cells for Transportation Program at Los Alamos National Laboratory, Washington, DC (Dec. 8, 1994).

Springer, T. E., et al., "Modeling and Experimental Diagnostics in Polymer Electrolyte Fuel Cells", J. of Electrochem Soc., vol. 140, No. 12, pp. 3513–3526 (1993). (Dec.).

Watkins, David E., Fuel Cells for Transportation—Core Research Program at Los Alamos National Laboratory (Dec. 8, 1994).

(List continued on next page.)

Primary Examiner—Stephen Kalafut

(57) ABSTRACT

An electrochemical fuel cell having a membrane electrode assembly and a flow field adjacent thereto wherein the flow field comprises an electrically conductive porous material having a porosity of at least about 50 percent and a mean pore size of at least about 35 microns. This fuel cell is able to operate at relatively high current densities and relatively high voltages at reduced gas flow rates.

17 Claims, 5 Drawing Sheets

U.S. PATENT DOCUMENTS

| | | | |
|---|---|---|---|
| 5,037,919 | 8/1991 | Clement et al. | 526/242 |
| 5,108,849 | 4/1992 | Watkins et al. | 429/30 |
| 5,171,644 | 12/1992 | Tsou et al. | 429/12 |
| 5,211,984 | 5/1993 | Wilson | 427/115 |
| 5,230,966 | 7/1993 | Voss et al. | 429/26 |
| 5,234,777 | 8/1993 | Wilson | 429/335 |
| 5,252,410 | 10/1993 | Wilkinson et al. | 429/33 |
| 5,284,718 | 2/1994 | Chow et al. | 429/26 |
| 5,300,370 | 4/1994 | Washington et al. | 429/34 |
| 5,330,860 | 7/1994 | Grot et al. | 429/42 |
| 5,395,705 | 3/1995 | Door et al. | 429/42 |
| 5,441,819 | 8/1995 | Voss et al. | 429/13 |
| 5,470,671 | 11/1995 | Fletcher et al. | 429/26 |
| 5,514,486 | 5/1996 | Wilson | 429/30 |
| 5,521,020 | 5/1996 | Dhar | 429/42 |
| 5,607,785 * | 3/1997 | Tozawa et al. | 429/42 X |
| 5,620,807 | 4/1997 | Mussell et al. | 429/33 |
| 5,641,586 * | 6/1997 | Wilson | 429/30 |

FOREIGN PATENT DOCUMENTS

| | | |
|---|---|---|
| 54-164231 | 12/1979 | (JP). |
| 61 052 383 | 7/1986 | (JP). |
| 6-333574 | 12/1994 | (JP). |
| 94/05049 | 3/1994 | (WO). |
| 94/25993 | 11/1994 | (WO). |
| 96/12316 | 4/1996 | (WO). |

OTHER PUBLICATIONS

Wilson, Mahlon S. et al., Extended Abstracts, vol. 95–2, pp. 1043–1044 (Oct. 8–13, 1995).

Patent Abstracts of Japan, JP 61 052 383, vol. 10, No. 214 (Jul. 25, 1986).

Murphy, O. J. et al., Journal of Power Sources, vol. 47, No. 3, pp. 353–368 (1994)(Month unknown).

Uchida, M. et al., J. Electrochem. Soc., vol. 142, No. 2, pp. 463–468 (Feb. 1995).

* cited by examiner

MACROPOROUS FLOW FIELD ASSEMBLY

CROSS REFERENCE TO RELATED APPLICATION

This application is a Continuation-in-Part of the application Ser. No. 08/540,105, filed Oct. 6, 1995 now abandoned.

BACKGROUND OF THE INVENTION

This invention relates to electrochemical fuel cells and, more particularly, to fuel cell membrane electrode assemblies and the flow field structures adjacent thereto.

Electrochemical fuel cells generate electrical current through the oxidation of a fuel. One type of fuel cell employs a membrane electrode assembly ("MEA") including a membrane having an anode side and cathode side, depending on the direction of the current with respect thereto. The membrane itself serves as an electrolyte. A suitable catalyst for the electrochemical reaction is applied to the membrane, or is incorporated into the polymeric composition from which the membrane is prepared. Alternatively, the catalyst is applied to carbon fiber paper, which is then laminated to the membrane to form the membrane electrode assembly.

Located on both sides of the MEA is a flow field which typically consists of a graphite plate which has been machined to provide a series of channels on its surface, as shown, for example, in U.S. Pat. Nos. 5,300,370 and 5,230,966. The channels transport fuel to the anode side and oxidant to the cathode side, and transport reaction products primarily from the cathode side, and are typically separated from the membrane electrode assembly by a thin layer of a porous carbon material, such as carbon fiber paper.

U.S. Pat. No. 5,252,410 describes a fuel cell membrane electrode assembly wherein a porous electrically conductive sheet material is used as the flow field. Such flow fields have been used in a MEA configuration where the dispersion of catalyst used in the preparation of the catalyst layer is applied to the porous flow field. In such configurations, adequate performance is only obtained when this catalyst flow field structure is then laminated to the membrane.

SUMMARY OF THE INVENTION

Figure 1:
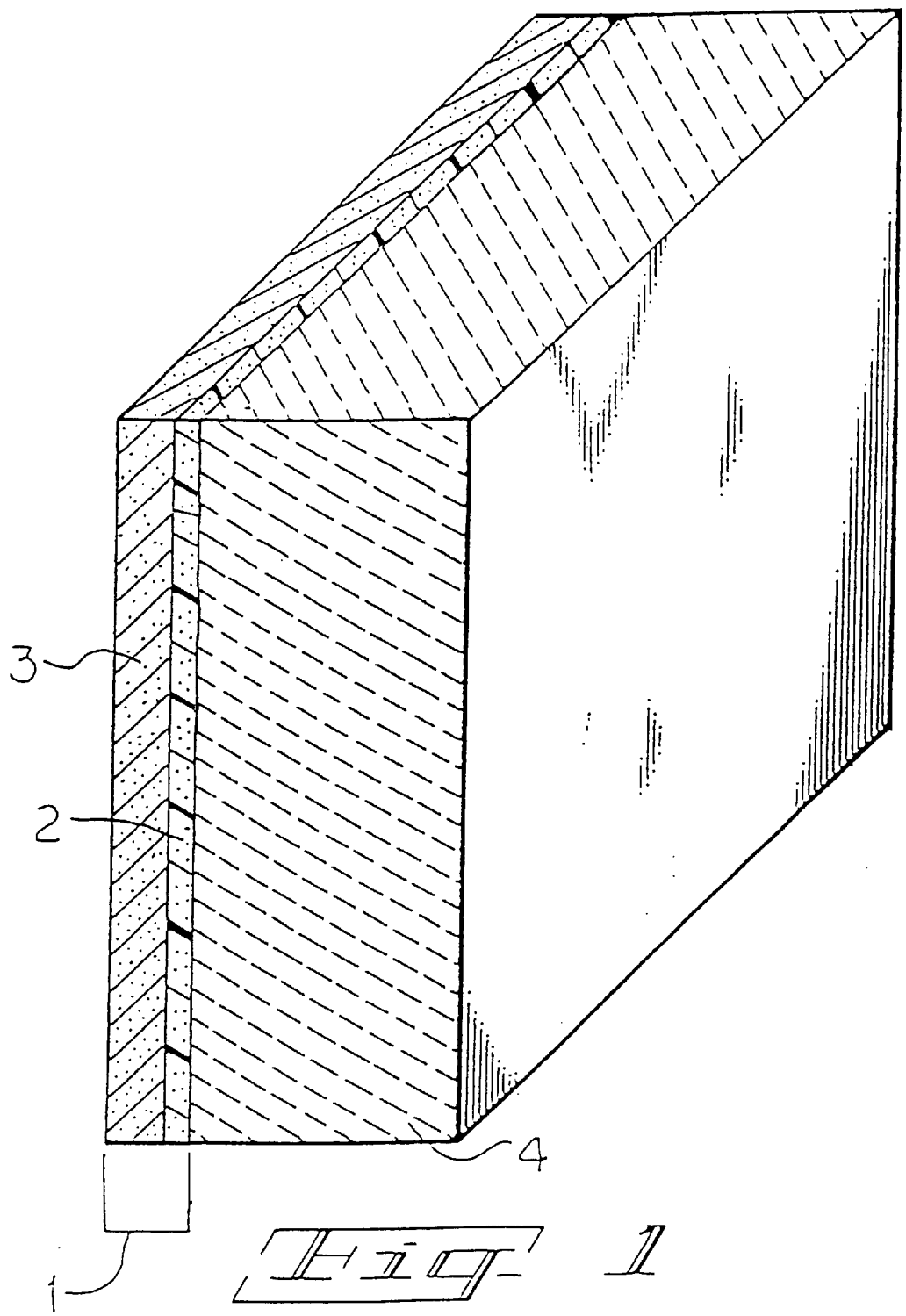
FIG. 1 illustrates one embodiment of the membrane electrode assembly and the flow field of the fuel cell of the invention.

In one aspect, this invention is an electrochemical fuel cell having a membrane electrode assembly and a flow field adjacent thereto wherein the flow field comprises an electrically conductive porous material having a porosity of at least about 50 percent and a mean pore size of at least about 35 microns.

It has been discovered that the fuel cell of the invention is able to operate at relatively high current densities and relatively high voltages at lower gas flow rates. In addition, the process of the invention may require a lower loading of catalyst than would be required if the catalyst were applied directly to the flow field. When the catalyst ink is applied directly to the flow field, it is difficult to obtain low catalyst loadings since the large pore size of the flow field does not allow a thin uniform coating of the catalyst layer without some of the catalyst filling the pores. Further, the lamination of a flow field/catalyst assembly to a membrane requires pressures that will crush the pore structure of the flow field (good contact of the catalyst layer to the membrane requires relatively high pressures). The crushing of the paper decreases its mean pore size and lowers its porosity. It is believed that the loss of pore size and porosity adversely affects the ability of the flow field to manage water that is produced at the cathode and keep open pores for effective transport of reactant gas. This loss of mean pore size and porosity also causes a large increase in pressure drop across the flow field.

Typically, in a fuel cell, the membrane and the layer of polymer containing a metal catalyst ("active layer") must be hydrated in order to be sufficiently ionically conductive. During operation of the fuel cell, water is formed on the cathode side of the active layer, which condenses within the adjacent flow field. Water may also be present due to the humidification of one or both of the reactant gases. However, if too much water condenses or otherwise accumulates adjacent to the active layer or within the active layer, the efficiency of the fuel cell is reduced, since diffusion of gas through liquid water is slow relative to its diffusion through water vapor.

The porosity and pore size characteristics of the flow field of the invention are believed to improve the mass transfer capabilities which results in higher voltages at high current densities. It is believed, without intending to be bound, that the relatively high porosity and large pores combine to preserve effective gas transport in the presence of liquid water. Because the feed gas flow is in the plane of the flow field and substantially parallel to the active layer, the liquid is swept away from the active layer and out of the flow field by the gas stream, thus keeping pores open for effective transport of reactant gas to the catalyst. However, when the flow field is relatively thick, (for example, greater than 20 mils for air feed stoichiometry equal to 2 at 30 psig) the gas velocity becomes inadequate to keep the pores clear of water. In such cases, increasing the wettability of the flow field is believed to promote a type of flow condition therein which may be referred to as annular flow, wherein the liquid spreads out onto the solid surfaces of the porous structure, leaving the centers of the large pores open and available for effective gas transport. These and other advantages of the invention will be apparent from the description which follows.

DETAILED DESCRIPTION OF THE INVENTION

Figure 2:
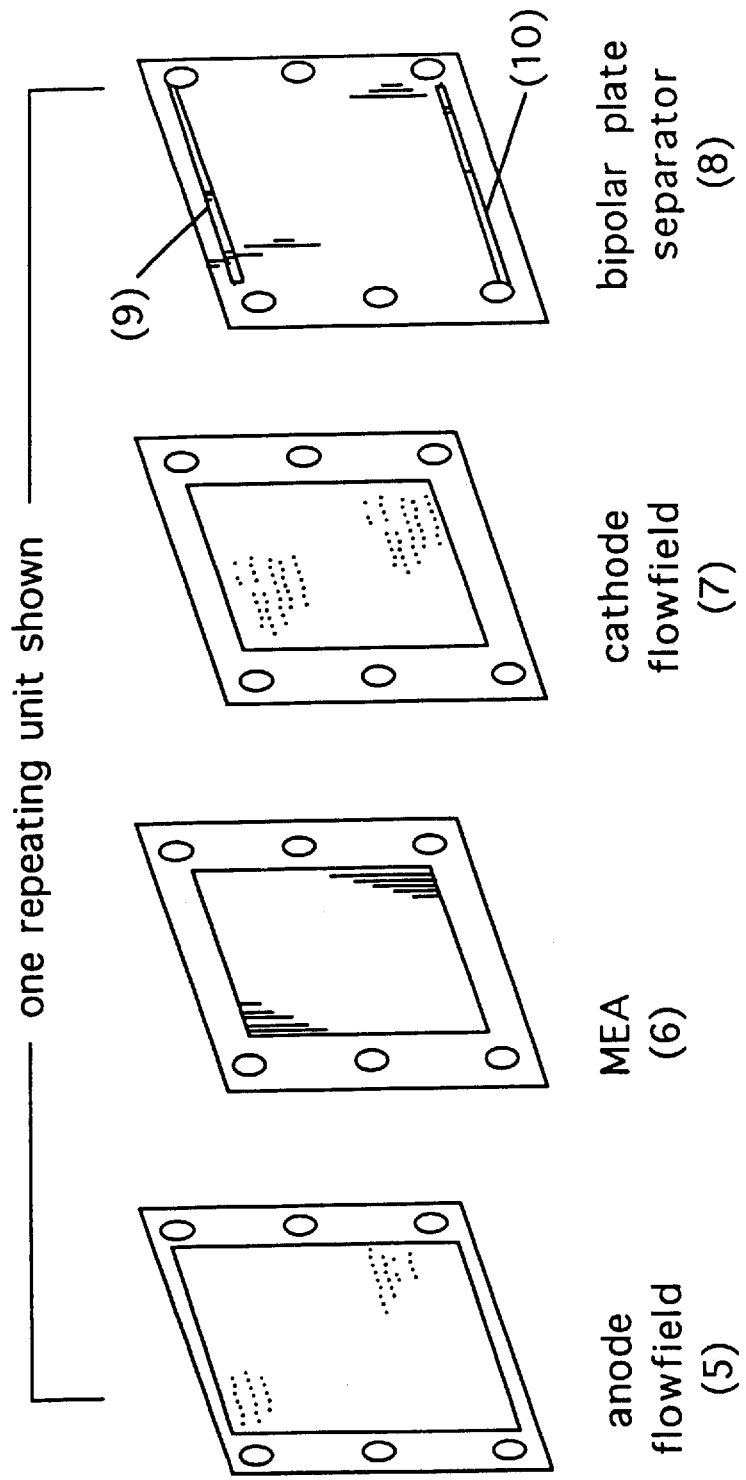
FIG. 2 illustrates one configuration of a repeat unit which may be utilized in the preparation of a fuel cell stack containing a plurality of fuel cells arranged in series, which incorporates the membrane electrode assembly and flow field illustrated in FIG. 1.
Figure 4:
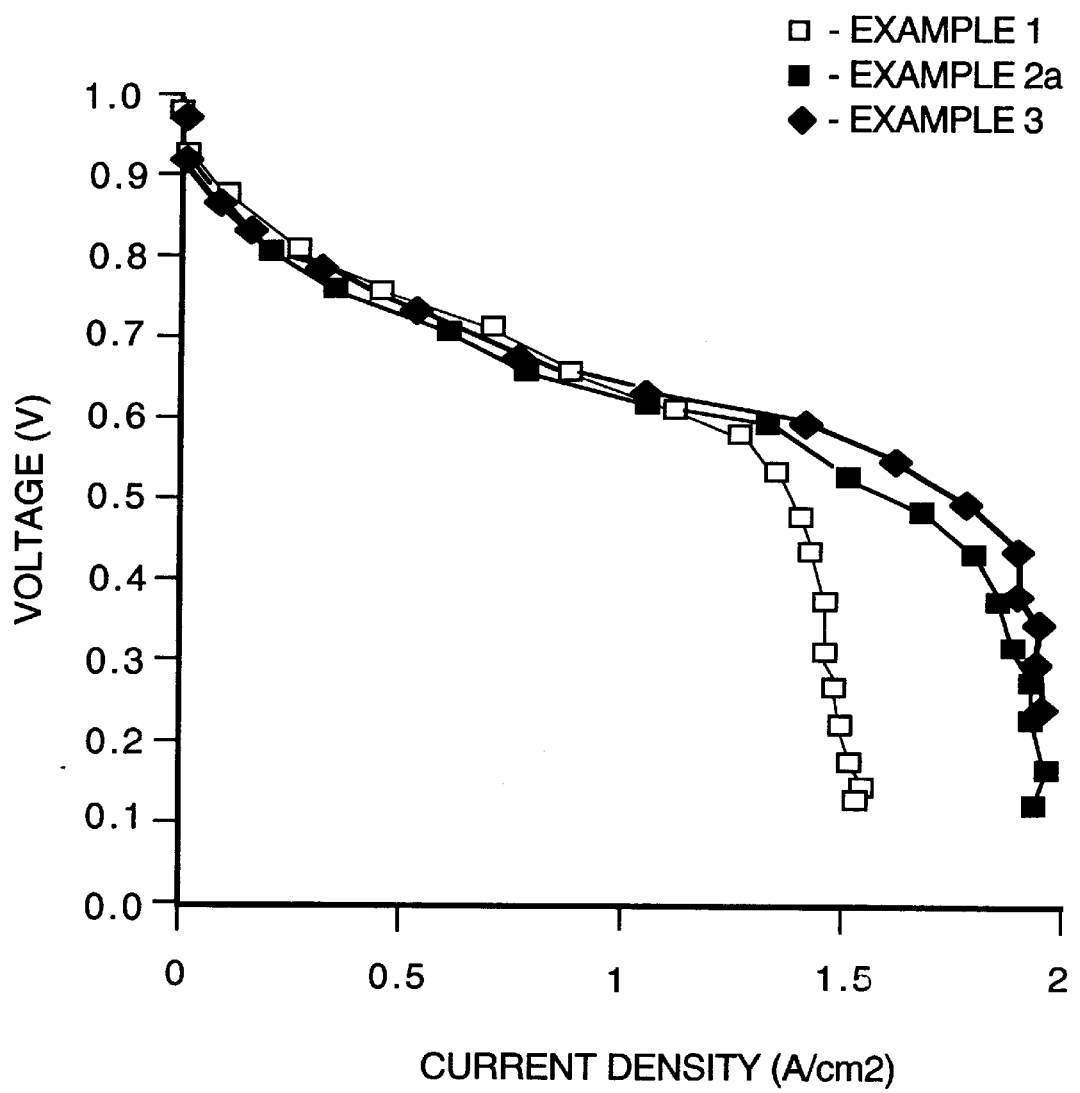

Referring now to FIG. 1, the term "membrane electrode assembly" (1) as used herein refers to the combination of the solid polymer membrane and catalyst in the fuel cell assembly, regardless of its configuration or method of preparation. The layer of membrane material containing the catalyst is referred to as the "active layer", regardless of whether the catalyst is incorporated into a discrete layer of polymer (2) and applied or laminated to the surface of the membrane (3), or incorporated into the membrane itself. The flow field (4) is a layer of an electrically conductive porous material having a gas stream inlet and outlet connected thereto. The flow field may comprise porous carbon material. The term "catalyst" as used herein refers to a metal or compound which is catalytic for the electroreduction of oxygen or electrooxidation of hydrogen or methanol under the pressure and temperature conditions in the fuel cell. The fuel cell of the invention preferably contains no impermeable flow field components having engraved, milled, or molded flow channels configured across its entire active face. These channels deliver gases directly to the active layer through a porous carbon "backing layer" which supports the active layer, as illustrated in FIGS. 1 and 4 of U.S. Pat. No. 5,108,849. However, the flow field, bipolar plates, and/or end plates used as supports for the fuel cell and to separate cells in a multi-cell configuration may contain one or more ducts therein to increase the flow of reactant gases to the flow field in the fuel cell of the invention. An example of such ducts is illustrated in FIG. 2.

Examples of suitable porous carbon materials which may be utilized as the flow field include carbon paper, graphite paper, carbon felts, or other carbon-based composites which comprise at least about 20 percent by weight of carbon. The flow field may have interdigitated channels cut into it to lower the pressure drop introduced into the reactant gases. When desirable, the porous carbon material may be treated with a perfluorosilane or fluorine composition to increase its hydrophobicity, or oxidized, sulfonated, or coated with a hydrophilic material to increase its hydrophilicity. If the flow field has a thickness of at least about 20 mils, it preferably has a relatively high wettability. The wettability of the flow field may be determined experimentally by the following method: a 3 inch by 3 inch sample of the flow field is held vertically in a pan containing water of 3/16 inch depth. The amount of water imbibed in 10 seconds is measured by weighing. Flow fields with a thickness of greater than about 20 mils preferably imbibe at least 0.5 g of water per g of porous material, more preferably at least about 1 g of water per g of porous material.

The conductivity of the flow field layer is preferably at least about 0.01 Siemens/cm (S/cm), more preferably at least about 0.1 S/cm, and most preferably at least about 0.2 S/cm. The preferred thickness of the flow field will depend on the optimal pressure drop across the flow field, but is preferably at least about 1 mil, more preferably at least about 5 mils, and is most preferably at least about 10 mils; but is preferably no greater than about 250 mils, more preferably no greater than about 100 mils, and is most preferably no greater than about 50 mils. The porosity of the flow field is preferably at least about 75 percent, more preferably at least about 80 percent. The mean pore size of the flow field is preferably at least about 45 microns, more preferably at least about 50 microns; but is preferably no greater than about 250 microns. The term "mean pore size" as used herein means that half the open volume of the material is contained in pores larger in diameter than the mean pore size, and half is contained in pores equal to or smaller than the mean pore size. The mean pore size may be measured by any convenient method, such as by mercury porosimetry. The device used to measure the mean pore size distribution of the layer may be calibrated using silica/alumina calibration standards (available from Micromeritics, Norcross, Ga.).

The MEA may be prepared by any suitable method, but is preferably prepared by applying the catalyst ink (a suspension or dispersion of the catalyst) directly to a solid polymer membrane as described, for example, in U.S. Pat. No. 5,211,984. Such inks typically comprise a catalyst (such as platinum supported on carbon), binder, solvent or dispersing aid and, optionally, a plasticizing agent. The binder is preferably a material similar to or the same as that from which the membrane has been prepared, such as a polytetrafluoroethylene polymer having sulfonic acid groups and an equivalent weight (based on the acid groups) in the range of from about 650 to about 1400. The ink is applied to the membrane in one or more applications sufficient to give a desired catalyst loading. Preferably, the catalyst layer is prepared by applying at least two inks in separate steps to form layers of the different inks, with the highest equivalent weight binder ink applied in such a manner so that it will be positioned adjacent to the flow field in the fuel cell. In such cases, the membrane electrode assembly comprises a solid polymer membrane having at least two layers of catalyst ink on at least one side thereof, wherein at least two layers of the catalyst ink comprise polytetrafluoroethylene polymers having pendant sulfonic acid groups, the equivalent weights of which differ by more than about 50, and wherein the layer having the highest equivalent weight is positioned adjacent to the flow field.

Once prepared, the MEA is positioned next to the flow field in the fuel cell assembly. The fuel cell of the invention may be incorporated in a multi-cell assembly or "stack" comprising a number of fuel cells arranged in series. An example of a repeat unit is illustrated in FIG. 2, which shows an anode flow field (5), an MEA (6), a cathode flow field (7), and a bipolar separator plate (8). The bipolar separator plate has ducts (9) and (10) which transport the reactants and reaction products to and from the flow field. In this configuration, the MEA is located between two porous flow fields that have an inert material impregnated into the border regions (the darker areas in the figure) in order to prevent the reactant gases from escaping to the outside. The holes in the border regions of all of the elements together form a gas manifold when they are stacked together and placed under compression. The material used to prepare bipolar plate separator may be selected from a variety of rigid or nonrigid materials, and the plate has gas delivery ducts molded or embossed into its surface. These ducts deliver reactant gases to, and remove reaction products from, the porous flow fields. In an alternative embodiment, gases and products may be introduced or removed via ducts or open spaces in the porous flow field connected to manifolds. The bipolar separator plate may also have an internal structure for circulating a cooling fluid therein.

Illustrative Embodiments

The following examples are given to illustrate the invention and should not be interpreted as limiting it in any way. Unless stated otherwise, all parts and percentages are given by weight.

EXAMPLE 1

Membrane and electrode structures are prepared as follows: An ion exchange membrane prepared from perfluorosulfonic acid ionomer having an equivalent weight of 800, a thickness of 2.4 mil (60 $\mu$m) dried and 5 mil (127 $\mu$m) fully hydrated (available from The Dow Chemical Company as XUS 13204.20) is obtained and cut into sheets 11 cm by 11 cm and placed into a NaOH bath to convert it to the Na+form. The electrode ink is prepared by mixing 1.08 g of a 5.79 weight percent solution of the above ionomer (in a 50:50 volume percent ethanol/water solution), 0.1875 g of 20 weight percent platinum on carbon (available from E-TEK (Natick, Mass.)) and 0.114 g of a 1M solution of tetrabutylammonium hydroxide (TBAOH, a plasticizing agent) in methanol, and 0.6 g of propylene carbonate (dispersing aid). The mixture is agitated with a stir bar overnight or until the mixture is uniformly dispersed. An additional 1.2 g of propylene carbonate is then added to the mixture.

The catalyst ink is painted onto clean, 9 cm$^2$ Teflon™-coated fiberglass blanks (CHR Industries, New Haven, Conn.) which have been dried in a oven at 110° C. and pre-weighed. The blanks are painted twice with the catalyst ink, which is completely dried before the application of the second layer. Pt loadings are 0.14 mg/cm² on the anode and 0.25 mg/cm² on the cathode. The MEA is formed by aligning a coated blank on each side of the ionomer membrane which has been dried on a vacuum table. The blanks and membrane are placed between two pieces of stainless steel to hold them while they are placed into the press. The assembly is placed into a press at 195° C. and pressed at a pressure of 100 pounds per cm² of blank for 5 minutes. The press package is allowed to cool to room temperature before opening. The blank is peeled away from the catalyst layer leaving the film adhered to the surface of the membrane. The cathode flow field is carbon paper having a porosity of 90 percent and a thickness of 24 mils (available as Spectracarb™ paper from Spectracorp (Lawrence, Mass.)). The wettability of the paper is increased by oxidation in a medium comprising 0.006M silver sulfate, 0.2M sodium persulfate, and 0.5M sulfuric acid, at a temperature of 60° C. for 1 hour. A 3×3-inch sample of the paper oxidized in this manner imbibes 2.7 g of water per g of carbon, when held vertically in a pan containing water of 3/16 inch depth for 10 seconds. The anode flow field is carbon paper having a porosity of 79 percent and a thickness of 14 mils. The edges of both the anode and cathode side flow fields are sealed by impregnation with an epoxy resin, leaving open the central region which will coincide with the active area of the MEA.

Figure 5:
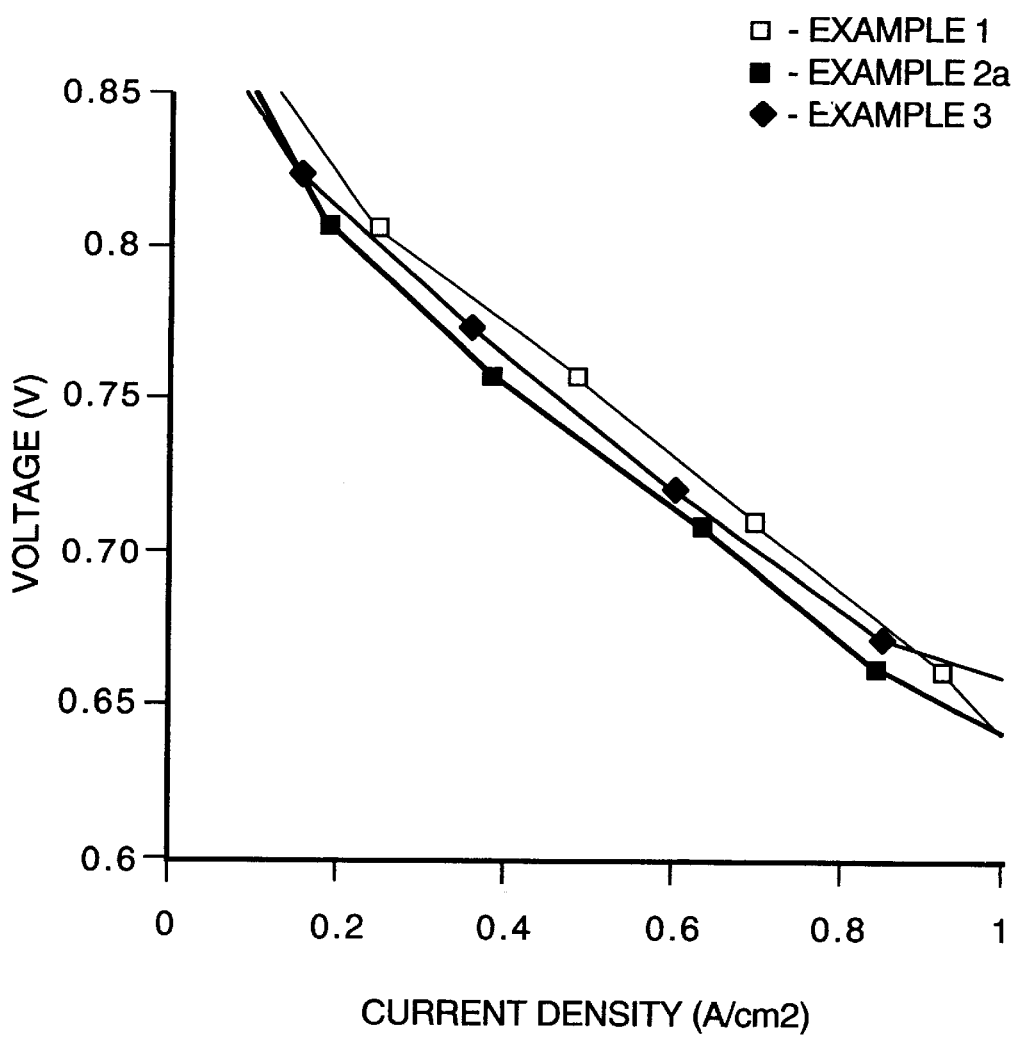

The membrane electrode assembly and porous flow fields are tested in a test fuel cell prepared by Fuel Cell Technologies, Inc. (Santa Fe, N. Mex.). The MEA and flow fields are placed between two solid graphite blocks (bipolar plate separators), each with a single gas delivery channel and a single exit channel. These channels are parallel to each other and are at the opposite ends of what will constitute the active electrode area as shown in FIG. 2. The delivery and exit channels are not connected to each other in the graphite blocks. A 10-mil thick layer of a graphite foil, (available from Grafoil®, UCAR Carbon Company, Cleveland, Ohio) having cutouts that match the channels in the graphite blocks is placed between the cathode flow field and one graphite block and also between the anode flow field and the other graphite block. The cell is placed onto a single cell test stand made by Fuel Cell Technologies, Inc. The performance of the flow field is illustrated in FIGS. 4 and 5, under the flow conditions set forth in Table 1. Air is used as the oxidant gas unless as otherwise noted in the following table.

TABLE 1

| Example # | Oxidant Humidifier Temperature (° C.) | Inlet Pressure (psig) | Outlet Pressure (psig) | Pressure Drop (psi) | Oxidant Stoichiometry at 2 A cm⁻² |
| --- | --- | --- | --- | --- | --- |
| 1 | 85 | 32.7 | 31.0 | 1.7 | 1.0 |
| 2a | 90 | 32.9 | 31.0 | 1.9 | 1.0 |
| 2b | 90 | 31.9 | 30.0 | 1.9 | 1.5 |
| 2c | 90 | 32.9 | 30.0 | 2.9 | 2.0 |
| 2d | 90 | 33.0 | 31.5 | 1.5 | 2.4* |
| 3 | 85 | 32.3 | 31.0 | 1.3 | 1.0 |

*oxygen as oxidant

EXAMPLE 2

Figure 3:
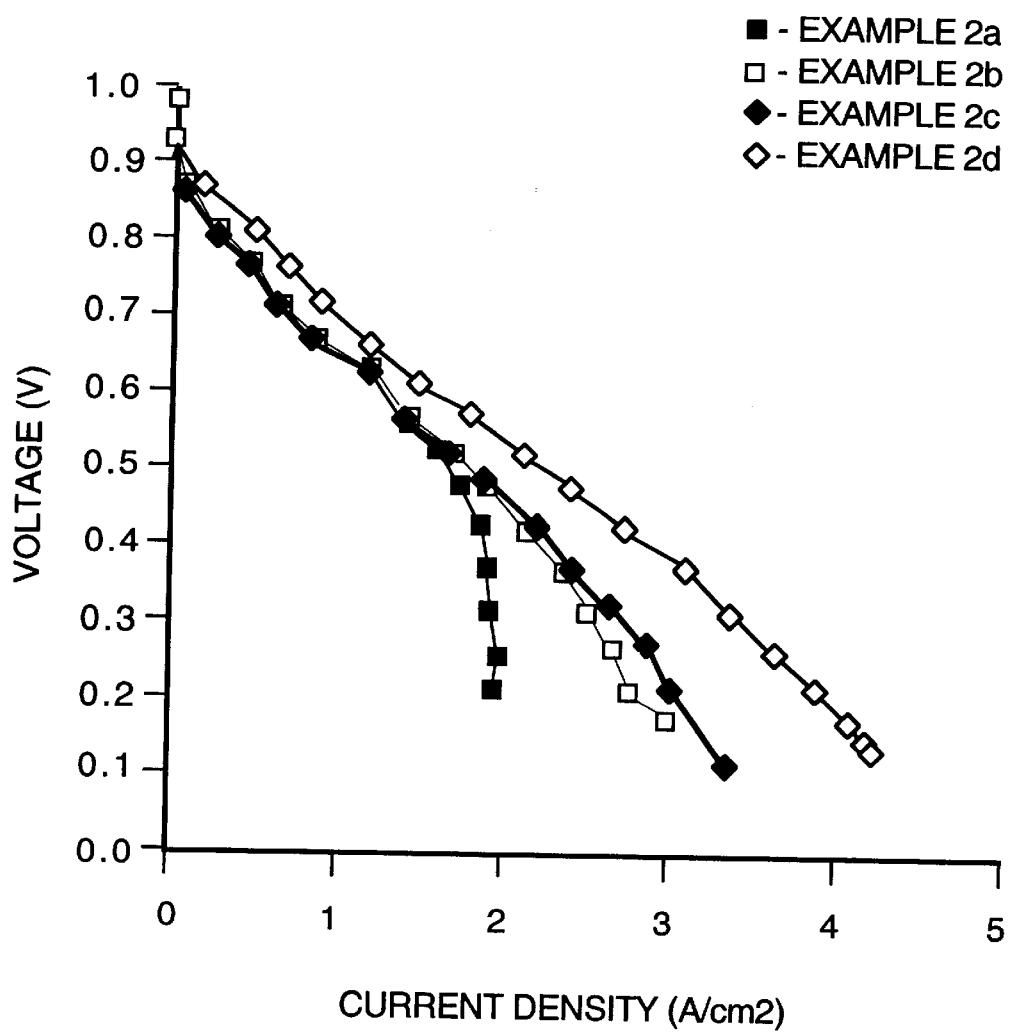
FIGS. 3, 4, and 5 illustrate the performance of the fuel cells referred to in Examples 1, 2, and 3.

An MEA/electrode structure is prepared using the procedure described in Example 1, except that the electrode ink is prepared by mixing 1 g of a 5% solution of Nafion™ (an 1100 equivalent-weight polytetrafluoroethylene having sulfonic acid groups, available from DuPont), 0.130 g of carbon-supported platinum containing 20 percent by weight of platinum, and 0.076 g of a 1M solution of tetrabutylammonium hydroxide (TBAOH) in methanol, and 1.2 g of propylene carbonate (a dispersing aid). A fuel cell is assembled and tested in accordance with the procedure described in Example 1. The performance of the flow field is illustrated in FIGS. 3, 4, and 5, under the flow conditions set forth in Table 1. Careful examination of the curve for Example 2a suggests that the mass transport limitation apparent in the curve was not caused by the presence of liquid in the flow field but rather by the consumption of all of the oxygen in the air feed to the fuel cell. The limiting current was just under 2 A/cm² when the air stoichiometry was 1× at 2 A/cm². The curve shows that the fuel cell may be operated at 2 A/cm² with air stoichiometry only slightly more than 1. When this fuel cell is incorporated into a multi-cell stack as part of a power generation system, the ability to operate on such low stoichiometry will help minimize the cost of a gas pressurization subsystem. Further increases in the flow rates (Example 2b, 2c) flattens out the curve, suggesting that the performance is almost entirely limited by the cell resistance and further confirms the absence of mass transfer limitations. A performance curve obtained using pure oxygen as the gas feed is shown in FIG. 3 as Example 2d.

EXAMPLE 3

An MEA/electrode structure is prepared using the procedure described in Example 1, except that two electrode inks as described in Examples 1 and 2 are prepared separately. The ink of Example 2 is painted onto the fiberglass blank to be used with the cathode side of the membrane, and allowed to dry completely, followed by an application of the ink described in Example 1. The ink described in Example 1 is applied to the fiberglass blank to be used with the anode side of the membrane. Platinum loadings are 0.14 mg/cm² on the anode side of the membrane and 0.25 mg/cm² on the cathode side of the membrane. A fuel cell is assembled and tested as described in Example 1. The performance of the fuel cell is illustrated in FIGS. 4 and 5, under the flow conditions set forth in Table 1.

What is claimed is:

1. An electrochemical fuel cell having a membrane electrode assembly and a flow field adjacent thereto wherein the flow field comprises an electrically conductive porous material having a porosity of a least about 50 percent and a mean pore size of at least about 35 microns, wherein when the porous material has a thickness of at least about 20 mils, the porous material is characterized in that a 3 inch by 3 inch portion of the material can imbibe at least about 0.5 g of water per gram of material in ten seconds when held vertically in 3/16 inch depth of water.

2. The fuel cell of claim 1 wherein the porous material has a thickness of at least about 20 mils, and a 3 inch by 3 inch portion of the material can imbibe at least about 0.5 g of water per g of material in ten seconds when held vertically in 3/16 inch depth of water.

3. The fuel cell of claim 2 wherein the porous material has a thickness of at least about 20 mils and can imbibe at least about 1 g of water per g of material.

4. The fuel cell of claim 1 wherein the flow field has a porosity of at least about 75 percent.

5. The fuel cell of claim 1 wherein the flow field has a porosity of at least about 80 percent.

6. The fuel cell of claim 1 wherein the flow field has a mean pore size of at least about 45 microns.

7. The fuel cell of claim 1 wherein the flow field has a mean pore size of at least about 50 microns.

8. The fuel cell of claim 1 wherein the flow field has a mean pore size of no greater than about 250 microns.

9. The fuel cell of claim 1 wherein the membrane electrode assembly comprises a solid polymer membrane having at least two layers of catalyst ink on at least one side thereof, wherein at least two layers of the catalyst ink comprise polytetrafluoroethylene polymers having pendant sulfonic acid groups, equivalent weights which differ by more than about 50, and wherein the layer having the highest equivalent weight is positioned adjacent to the flow field.

10. The fuel cell of claim 9 wherein the porous material has a porosity of at least about 80 percent and a mean pore size of at least about 50 microns.

11. The fuel cell of claim 10 wherein the porous material has a thickness of at least about 20 mils, and a 3 inch by 3 inch portion of the material can imbibe at least about 1 g of water per g of material in ten seconds when held vertically in 3/16 inch depth of water.

12. A stack assembly comprising at least 3 of the fuel cells of claim 1 arranged in series.

13. The fuel cell of claim 1 wherein the porous material has a thickness of at least 20 mils.

14. The fuel cell of claim 9 wherein the porous material has a thickness of at least 20 mils.

15. A stack assembly having at least three repeat units which comprise, in sequence (a) a flow field, (b) a membrane electrode assembly, (c) a flow field, and (d) a separator plate; wherein (a) and (c) comprise an electrically conductive porous material having a porosity of at least about 50 percent and a mean pore size of at least about 35 microns and when (a) or (c) has a thickness of at least about 20 mils the porous material in that layer (a) or (c) is characterized in that a 3 by 3 inch portion of the material can imbibe at least about 0.5 g of water per gram of material in ten seconds when held vertically in 3/16 inch of water.

16. An electrochemical fuel cell having a membrane electrode assembly in direct contact with a flow field wherein the flow field comprises an electrically conductive, porous material having a porosity of at least about 50 percent and a mean pore size of at least about 35 microns wherein when the flow field has a thickness of at least about 20 mils, the porous material is characterized in that a 3 inch by 3 inch portion of the material can imbibe at least about 0.5 g of water per gram of material in ten seconds when held vertically in 3/16 inch depth of water.

17. An electrochemical fuel cell consisting essentially of a membrane electrode assembly and a flow field adjacent thereto wherein the flow field comprises an electrically conductive, porous material having a porosity of at least about 50 percent and a mean pore size of at least about 35 microns wherein when the flow field has a thickness of at least about 20 mils, the porous material is characterized in that a 3 inch by 3 inch portion of the material can imbibe at least about 0.5 g of water per gram of material in ten seconds when held vertically in 3/16 inch depth of water.

* * * * *